US009113050B2

(12) United States Patent
Laughlin

(10) Patent No.: US 9,113,050 B2
(45) Date of Patent: *Aug. 18, 2015

(54) AUGMENTED COLLABORATION SYSTEM

(75) Inventor: Brian Dale Laughlin, Wichita, KS (US)

(73) Assignee: THE BOEING COMPANY, Chicago, IL (US)

( * ) Notice: Subject to any disclaimer, the term of this patent is extended or adjusted under 35 U.S.C. 154(b) by 564 days.

This patent is subject to a terminal disclaimer.

(21) Appl. No.: 13/005,753

(22) Filed: Jan. 13, 2011

(65) Prior Publication Data
US 2012/0183137 A1    Jul. 19, 2012

(51) Int. Cl.
H04N 7/18    (2006.01)
(52) U.S. Cl.
CPC ..................... H04N 7/185 (2013.01)
(58) Field of Classification Search
USPC ............................ 348/143, E7.085; 345/633
See application file for complete search history.

(56) References Cited

U.S. PATENT DOCUMENTS

| | | | |
|---|---|---|---|
| 6,166,744 A | 12/2000 | Jaszlics et al. | |
| 8,902,254 B1 | 12/2014 | Laughlin et al. | |
| 2002/0010734 A1* | 1/2002 | Ebersole et al. | 709/201 |
| 2004/0189675 A1* | 9/2004 | Pretlove et al. | 345/633 |
| 2005/0123172 A1* | 6/2005 | Henson | 382/103 |
| 2005/0128197 A1 | 6/2005 | Thrun et al. | |
| 2007/0127015 A1 | 6/2007 | Palmateer et al. | |
| 2007/0229498 A1 | 10/2007 | Matusik et al. | |
| 2007/0242131 A1 | 10/2007 | Sanz-Pastor et al. | |
| 2007/0273610 A1 | 11/2007 | Baillot | |
| 2008/0030575 A1* | 2/2008 | Davies et al. | 348/92 |
| 2009/0245512 A1* | 10/2009 | Masui et al. | 380/54 |
| 2009/0257589 A1* | 10/2009 | Yokota et al. | 380/216 |
| 2009/0322671 A1* | 12/2009 | Scott et al. | 345/156 |
| 2010/0149323 A1 | 6/2010 | Yoo et al. | |
| 2010/0149330 A1* | 6/2010 | Salgar et al. | 348/143 |
| 2010/0168891 A1 | 7/2010 | Kretsis | |
| 2010/0257252 A1 | 10/2010 | Dougherty et al. | |
| 2011/0102460 A1 | 5/2011 | Parker | |
| 2011/0134108 A1 | 6/2011 | Hertenstein | |
| 2011/0216089 A1 | 9/2011 | Leung | |
| 2011/0287811 A1 | 11/2011 | Mattila et al. | |

FOREIGN PATENT DOCUMENTS

| | | | | |
|---|---|---|---|---|
| DE | 102006033064 A1 | 2/2007 | | |
| WO | 0225319 A2 | 3/2002 | | |
| WO | WO 0225319 A2 * | 3/2002 | | G01V 13/00 |

OTHER PUBLICATIONS

"What is Photosynth?", Microsoft Photosynth, 1 Page, accessed Aug. 24, 2010, http://photosynth.net/about.aspx.
"PolyWorks", InnovMetric Software, 1 Page, accessed Aug. 24, 2010 innovmetric.com/.../ai_pointclous.aspx . . . .
"RealityServer Platform", mental images, 2 Pages, accessed Aug. 24, 2010 mentalimages.com/.../realityserver.html.

(Continued)

Primary Examiner — Mohammed Rahaman
(74) Attorney, Agent, or Firm — Yee & Associates, P.C.

(57) ABSTRACT

A method and apparatus for displaying information. A camera system generates video data for an object from a viewpoint of the camera system at a location of the object. Information is identified about the object. The information is displayed on images in the video data on a display system at a number of locations. The display of the images with the information on the images in the video data at the number of locations is from the viewpoint of the camera system.

9 Claims, 10 Drawing Sheets

(56) References Cited

OTHER PUBLICATIONS

"Nvidia Tesla GPU Computing Solutions for Workstations", Nvidia Tesla Personal Supercomputer, 2 Pages, accessed Aug. 24, 2010, nvidia.com/...personal_supercomputin . . . .
PCT search report dated Dec. 15, 2011 regarding application PCT/US2011/052636, filing date Sep. 21, 2011, applicant The Boeing Company, 10 Pages.
Related U.S. Appl. No. 12/874,586, filed Sep. 2, 2010, 45 Pages.
Office Action, dated Sep. 21, 2012, regarding U.S. Appl. No. 12/874,586, 21 pages.
U.S. Appl. No. 12/874,586, filed Sep. 2, 2010, Laughlin et al.
International Preliminary Report on Patentability, dated Jul. 16, 2013, regarding Application No. PCT/US2011/052636, 6 pages.
Final Office Action, dated Feb. 28, 2013, regarding U.S. Appl. No. 12/874,586, 26 pages.
Azuma, "Overview of Augmented Reality," SIGGRAPH '04: ACM SIGGRAPH 2004 Course Notes Article No. 26, Aug. 2004, 11 pages.
Haritos et al., "A Mobile Application of Augmented Reality for Aerospace Maintenance Training," Proceedings of the 24th Digital Avionics Systems Conference (DASC 2005), vol. 1, Oct.-Nov. 2005, 10 pages.
Office Action, dated Sep. 19, 2013, regarding U.S. Appl. No. 12/874,586, 30 pages.
Final Office Action, dated Jan. 27, 2014, regarding U.S. Appl. No. 12/874,586, 31 pages.
Notice of Allowance, dated Jul. 30, 2014, regarding U.S. Appl. No. 12/874,586, 14 pages.
Laughlin "Portably Augmented Reality", U.S. Appl. No. 14/556,865, filed Dec. 1, 2014, 57 pages.

* cited by examiner

AUGMENTED COLLABORATION SYSTEM

BACKGROUND INFORMATION

1. Field

The present disclosure relates generally to aircraft and, in particular, to aircraft maintenance. Still more particularly, the present disclosure relates to a method and apparatus for providing collaboration between persons in different locations on aircraft maintenance issues.

2. Background

Aircraft maintenance may include a number of different operations. These operations may include, for example, inspection, modification, upgrading, reworking, reconfiguration, and/or performing other operations on an aircraft.

In aircraft maintenance, different components of aircraft may be removed or installed. Additionally, different components may be reworked while on the aircraft or removed from the aircraft.

Maintenance on aircraft may be performed on a regularly scheduled basis or in response to an indication that maintenance may be needed. For example, maintenance may be performed to rework a composite skin panel on the fuselage of an aircraft in response to the detection of an inconsistency on the skin panel. This inconsistency may, in some cases, involve repainting the surface of the skin panel. In other instances, the maintenance may involve reworking portions of the skin panel to reduce or remove the inconsistency.

In yet another example, maintenance may be performed on various systems in the aircraft. For example, an electrical system connecting components in the aircraft may require maintenance to provide a desired level of performance. This maintenance may include identifying and replacing a wiring harness or other components in the electrical system or other system.

When maintenance is performed at an unscheduled time, the aircraft is unavailable for use in transporting people and/or cargo. Further, unexpected maintenance on the aircraft may cause a delay in the flight or even a cancellation of the flight. When an aircraft is on the ground for this type of maintenance, the cost to the airline or other owner of the aircraft is expensive.

In some cases, the maintenance may require hours, days, or even weeks. As a result, the airline may have a reduced capacity in providing services or may use less-efficient aircraft to take the place of the aircraft on the ground for maintenance. In some cases, an airline may plan for these types of unexpected maintenance by having additional aircraft available. The additional aircraft, however, results in increased costs in the purchase and maintenance of those aircraft. Having extra aircraft for these situations may reduce the possibility that a particular flight may be delayed and/or cancelled.

Therefore, it would be advantageous to have a method and apparatus that takes into account at least some of the issues discussed above, as well as possibly other issues.

SUMMARY

In one advantageous embodiment, an apparatus comprises a computer system. The computer system is configured to receive video data for an object from a camera system at a location of the object and identify information about the object. The computer system is configured to add the information to the video data and send the video data with the information added to the video data to a display system at a number of locations. A display of the video data on the display system displays the information on images in the video data from a viewpoint of the camera system.

In another advantageous embodiment, a method is present for displaying information. A camera system generates video data for an object from a viewpoint of the camera system at a location of the object. The information is identified about the object. The information is displayed on images in the video data on a display system at a number of locations. The display of the images with the information on the images in the video data at the number of locations is from the viewpoint of the camera system.

In yet another advantageous embodiment, an augmented reality information system for performing maintenance on an aircraft comprises a head-mounted system, a number of display devices, and an information module. The head-mounted system has a camera system and a display device. The head-mounted system is configured to generate video data for an object at a location. The number of display devices is at a number of locations. The information module is configured to receive the video data for the object from the camera system in the head-mounted system and identify information about the object. The information module is configured to add the information to the video data. The information module is configured to identify selected information for each of the number of display devices based on a profile for a person using each of the number of display devices and send the video data with the information to the number of display devices. A display of the video data on the number of display devices displays the selected information on the images for each of the number of display devices.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
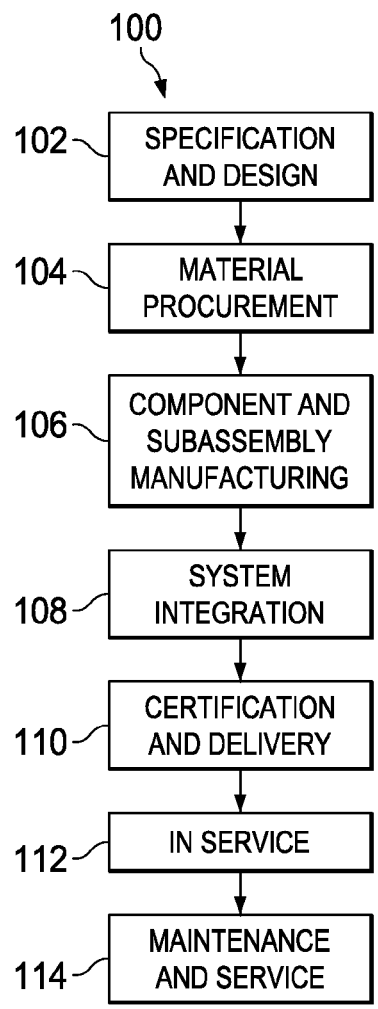
FIG. 1 is an illustration of an aircraft manufacturing and service method in accordance with an advantageous embodiment.
Figure 2:
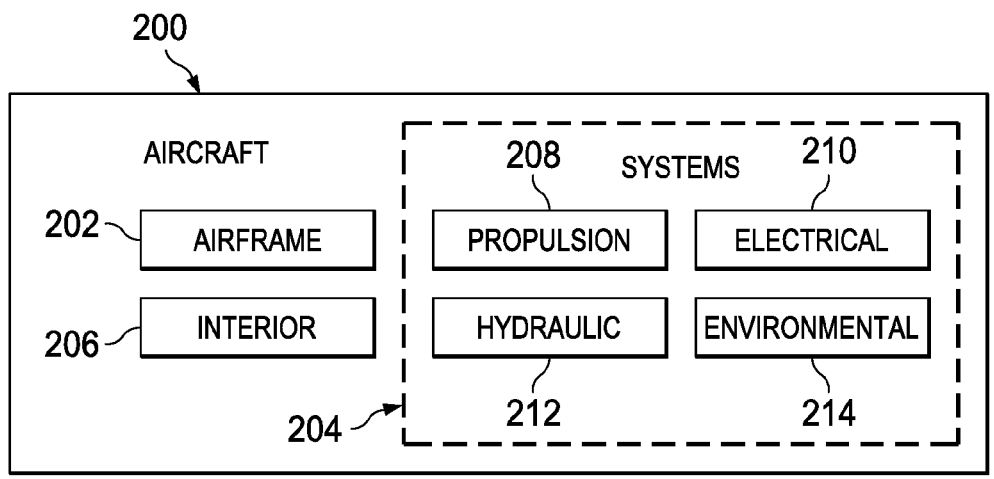
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, or service organization.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that when an aircraft is on the ground for maintenance, personnel available for maintenance may be limited.

For example, different personnel may have different levels of skill and experience with different aircraft. If the aircraft has a composite skin panel with an inconsistency, the maintenance person assigned to the aircraft may not be as experienced as desired with that type of material. As a result, the maintenance person may perform research to perform a particular maintenance task, such as inspecting an inconsistency and identifying an appropriate operation to reduce or remove the inconsistency from the skin panel of an aircraft. With respect to skin panels manufactured from composite materials, the orientation of layers, previous rework, and other factors may affect the manner in which maintenance is performed on a skin panel with an inconsistency.

In some cases, the maintenance person may set up meetings with other maintenance personnel or experts to identify the appropriate operations to perform. The different advantageous embodiments recognize and take into account that this process takes time and increases the expense to the aircraft. The expense is increased in terms of unavailability of the aircraft.

Thus, the different advantageous embodiments provide a method and apparatus for obtaining information about objects. In these illustrative examples, the different advantageous embodiments may be particularly useful to obtaining information about aircraft and, more specifically, to obtaining information to perform maintenance operations on aircraft.

In one advantageous embodiment, a camera system generates video data for an object from a viewpoint of the camera system at a location of the object. Information about the objects is identified. This information is displayed on the images in the video data on a display system at a number of locations. The display of the images with the information on the images at the number of locations is from the viewpoint of the camera system.

With this type of display, different personnel at different locations may collaborate with the person at the location of the object to provide more information about that object.

For example, if the object is an aircraft, the image in the video data may be a portion of the aircraft in which an inconsistency is present. Persons at the different locations may be experts or have knowledge of the particular types of inconsistencies in aircraft. These persons may provide input to the maintenance person at the aircraft to identify maintenance operations that may be needed.

Figure 3:
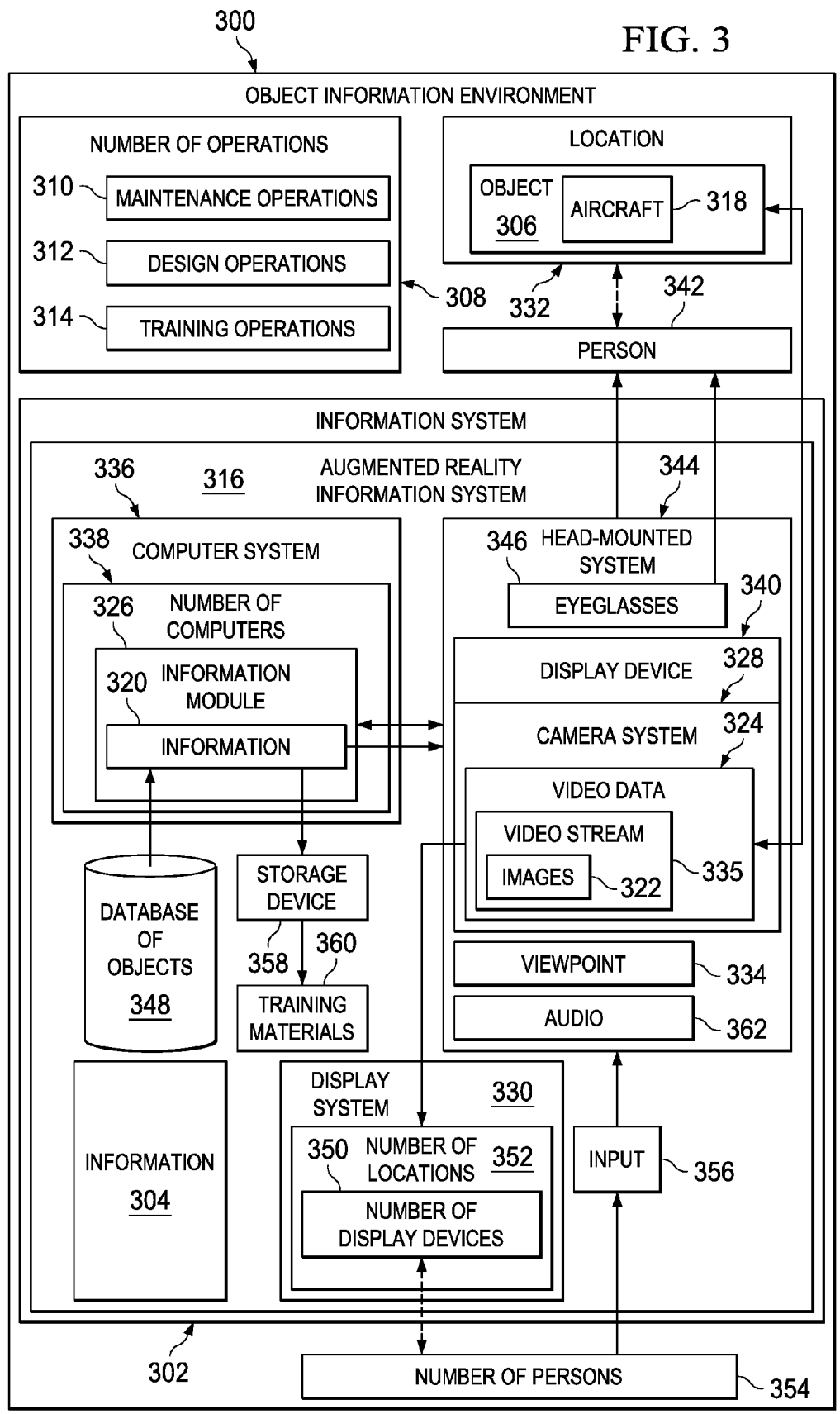
FIG. 3 is an illustration of an object information environment in accordance with an advantageous embodiment.

With reference now to FIG. 3, an illustration of an object information environment is depicted in accordance with an advantageous embodiment. Object information environment 300 may be used during various parts of aircraft manufacturing and service method 100 in FIG. 1. For example, object information environment 300 may be used to obtain information about components and subassemblies being assembled during component and subassembly manufacturing 106 and system integration 108 of aircraft 200 in FIG. 2. In addition, object information environment 300 also may be used during maintenance and service 114 to perform various maintenance operations in addition to other parts of aircraft manufacturing and service method 100.

In these illustrative examples, information system 302 in object information environment 300 provides information 304 about object 306. In these illustrative examples, object 306 may take the form of aircraft 200 in FIG. 2.

Information 304 may be used to perform number of operations 308. Number of operations 308, in these illustrative examples, may include at least one of maintenance operations 310, design operations 312, training operations 314, and other suitable types of operations with respect to object 306. Maintenance operations 310 may include operations, such as, for example, without limitation, inspection, rework of components, reconfiguration, upgrades, and other suitable types of operations that may be performed during maintenance of object 306.

Design operations 312 may involve designing components for use with object 306. These objects may be new components or replacement components for components within object 306. Training operations 314 may involve training personnel to perform different operations on object 306, including performing maintenance on object 306, operating object 306, and other types of operations.

In these illustrative examples, information system 302 may take the form of augmented reality information system 316 for performing maintenance operations 310 on object 306 in the form of aircraft 318. Aircraft 318, in these examples, may be implemented using aircraft 200 in FIG. 2.

In these illustrative examples, augmented reality information system 316 is configured to display information 320 about object 306 on images 322 in video data 324 of object 306. In these illustrative examples, augmented reality information system 316 generates a live or direct view of a physical real world environment in which a view of objects, such as object 306, is augmented by computer generated information. In this example, images 322 are augmented with information 304. Information 304 may take a number of different forms. For example, information 304 may be text, graphics, or other information that may be placed on images 322.

In this illustrative example, augmented reality information system 316 comprises information module 326, camera system 328, display system 330, and other suitable components. Camera system 328 is configured to generate video data 324 for object 306. In these illustrative examples, object 306 is located at location 332. Images 322 in video data 324 are generated from viewpoint 334 of camera system 328.

In these illustrative examples, camera system 328 is configured to generate video data 324 in the form of video stream 335 containing images 322. Images 322 may be displayed on display system 330 to provide a video of object 306. In these illustrative examples, video data 324 is sent to display system 330 as video data 324 is generated, rather than storing video data 324 for later viewing. However, in some illustrative examples, video data 324 may be stored in a storage device as video data 324 is generated in addition to being sent to display system 330. In yet other illustrative examples, video data 324 may be stored in a storage device as video data 324 is generated and then retrieved for later viewing at display system 330.

In these illustrative examples, information module 326 may be implemented in hardware, software, or a combination of the two. Information module 326 may be located in computer system 336 or may be a separate component in the depicted examples. Computer system 336 comprises number of computers 338. Number of computers 338 is in communication with each other in these illustrative examples. Number of computers 338 may be in the same location or may be in different locations, depending on the particular implementation.

In the depicted examples, camera system 328 and display device 340 are worn by person 342 at location 332 of object 306. In the different illustrative examples, camera system 328 in display device 340 may take the form of head-mounted system 344.

In one example, head-mounted system 344 is in the form of eyeglasses 346 worn by person 342. In this implementation, viewpoint 334 is from the viewpoint of person 342 wearing eyeglasses 346 at location 332 of object 306.

In other illustrative examples, camera system 328 and display device 340 may be separate components. For example, camera system 328 may be associated with a jacket or uniform worn by person 342, and display system 330 may be in eyeglasses 346. In yet other illustrative examples, display device 340 may be a handheld device, depending on the particular implementation. In still other illustrative examples, camera system 328 and display device 340 may be operated by, for example, without limitation, a robot.

In these illustrative examples, information module 326 identifies information 320 from database of objects 348. Information 320 may take a number of different forms. For example, information 320 may be, for example, without limitation, an identification of materials, dimensions, operations to be performed on parts of object 306, and other suitable information about object 306. In these illustrative examples, the identification of information 320 to display on images 322 may be made by user input identifying object 306, user input identifying a part on object 306, object recognition processes, and/or other suitable types of identification.

In these illustrative examples, display system 330 may include number of display devices 350 at number of locations 352. Although not shown, display system 330 also may include other components needed to display video data 324. For example, display system 330 also may include graphics adapters, processor units, computers, and/or other suitable components. In some cases, display system 330 may only include number of display devices 350.

Number of locations 352 may be locations other than location 332 or may include location 332. In these illustrative examples, number of persons 354 may be located in number of locations 352 and view number of display devices 350. Information 320 may be added to images 322 and video data 324. Video data 324 with information 320 added to images 322 may then be sent to number of display devices 350 for display.

With respect to the display of information 320 on images 322 on display device 340 in head-mounted system 344, head-mounted system 344 may include a processor configured to add information 320 to images 322 directly. In other words, information 320 may be received from information module 326. Video data 324 is received from camera system 328.

Head-mounted system 344 adds information 320 to images 322 from video data 324 received from camera system 328. In other illustrative examples, head-mounted system 344 may receive video data 324 with information 320 added to images 322 by information module 326 in the same manner as with number of display devices 350.

In this manner, number of persons 354 may provide input 356 about object 306. Input 356 may include, for example, operations to be performed on object 306, instructions to person 342 to move or change the portion of object 306 viewed by camera system 328, questions regarding object 306, and/or other suitable types of input. Instructions to person 342 in input 356 may take the form of text, voice, and/or other suitable forms of instructions.

In addition, head-mounted system 344 also may include audio 362 with video data 324. Audio 362 may be voice for person 342. In this manner, with audio 362 by person 342 and voice in input 356 from number of persons 354, a discussion can take place while person 342 is located at object 306. As a result, a collaboration between person 342 and number of persons 354 may be performed without person 342 leaving location 332.

Also, person 342 may perform number of operations 308 under the direction of number of persons 354. Number of persons 354 may be able to provide directions on number of operations 308 by viewing video data 324 with information 320 on images 322 while person 342 performs number of operations 308.

In this manner, number of operations 308 may be performed on object 306 more quickly using augmented reality information system 316, as compared to current systems. By allowing number of persons 354 to see object 306 as seen by person 342 at location 332 of object 306, input 356 may be obtained more quickly than with current processes. For example, person 342 may not need to perform research regarding object 306. Instead, information module 326 may identify information 320 for object 306 and display information 320 on images 322 in video data 324 while person 342 is looking at object 306.

In other examples, by sending video data 324 with information 320 on images 322, number of persons 354 may more quickly provide input 356. Input 356 may be provided without person 342 leaving object 306 to attend, for example, a meeting.

In still other illustrative examples, video data 324 with information 320 on images 322 may be stored in storage device 358. Additionally, input 356 also may be stored in storage device 358 to form training materials 360. Training materials 360 may be viewed by others at a later point in time to learn about number of operations 308 that may have been discussed.

The illustration of object information environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, number of display devices 350 may not be present. In other illustrative examples, computer system 336 may include processes configured to provide input 356 about object 306. As another example, in some illustrative examples, computer system 336 may be configured to include pattern recognition processes.

These pattern recognition processes may, for example, allow for identification of components or parts in the images. Based on the recognition of those parts or components, suggestions may be made as to what procedures to perform.

Also, information 320 may take other forms than information that is displayed on images 322. For example, without limitation, information 320 may include audio. The audio may be sound or voice that may be presented as images 322 are displayed.

As another illustrative example, although display devices, such as display device 340 and number of display devices 350, may take the form of display screens on which images 322 are presented; these display devices also may take other forms. For example, a virtual retina display also may be used. With a virtual retina display, the display device projects and/or draws a raster display directly onto the retina of the eye of the person viewing the image.

In some illustrative examples, augmented reality information system 316 may include a number of other devices configured to generate video data 324 in addition to or in place of camera system 328. For example, augmented reality information system 316 may include at least one of an ultrasound imaging device, an infrared imaging device, a radio frequency device, and/or some other suitable type of device configured to generate images 322 and/or data that may be used to form images 322.

Figure 4:
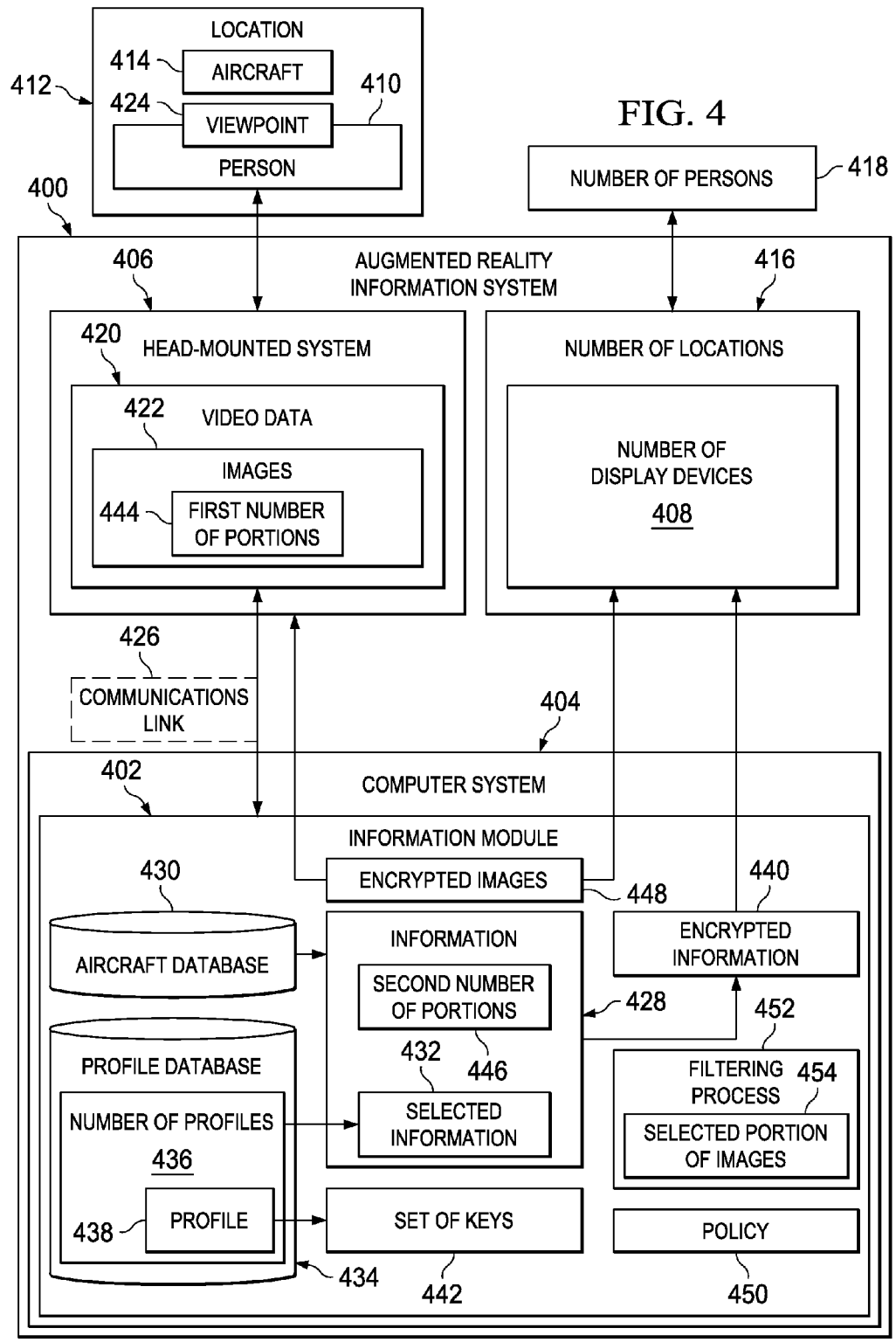
FIG. 4 is an illustration of data flow in an augmented reality information system in accordance with an advantageous embodiment.

With reference now to FIG. 4, an illustration of data flow in an augmented reality information system is depicted in accordance with an advantageous embodiment. In this illustrative example, augmented reality information system 400 is an example of one implementation for augmented reality information system 316 in FIG. 3.

In this illustrative example, augmented reality information system 400 includes information module 402 in computer system 404, head-mounted system 406, and number of display devices 408. Head-mounted system 406 is hardware configured to be worn by person 410 at location 412. In these examples, aircraft 414 is located at location 412. Number of display devices 408 is located at number of locations 416. Number of persons 418 at number of locations 416 may use number of display devices 408.

In these illustrative examples, head-mounted system 406 generates video data 420 of aircraft 414. Video data 420 includes images 422 from viewpoint 424 of person 410. In these illustrative examples, video data 420 is sent to information module 402. This information may be sent over communications link 426. Communications link 426 is a wired and/or wireless communications link, depending on the particular implementation.

Information module 402 identifies information 428 for display on images 422. Information 428 is identified using aircraft database 430 in these illustrative examples.

Further, information 428 may be the same for person 410 and number of persons 418. In other illustrative examples, information 428 may be different for person 410 and number of persons 418. The identification of information 428 for person 410 may take the form of selected information 432. Further, selected information 432 in information 428 also may be identified for number of persons 418. In some cases, selected information 432 may be the same as information 428 or may be a subset of information for aircraft 414.

In these illustrative examples, information module 402 may use profile database 434 to identify selected information 432 for person 410 and number of persons 418. In these examples, profile database 434 includes number of profiles 436. This number of profiles may be used by information module 402 to identify selected information 432 for a particular person.

Each profile in number of profiles 436 corresponds to one of person 410 and number of persons 418. For example, profile 438, in this example, corresponds to person 410. Profile 438 provides an identification of what information should be included in selected information 432 from information 428. As a result, selected information 432 may be tailored or selected specifically based on each of person 410 and number of persons 418.

Further, policy 450 may be applied to profile 438 for person 410 to identify selected information 432 from information 428. Policy 450 may be, for example, without limitation, a number of rules, a language for the person, a security or clearance level, guidelines, and/or criteria for selecting which portions of information 428 can be used to form selected information 432 for person 410.

In some illustrative examples, only selected information 432 is sent to head-mounted system 406 in number of display devices 408. In this manner, less than all of information 428 may be sent to each display device.

In other illustrative examples, all of information 428 may be sent to head-mounted system 406 and number of display devices 408. For example, all of information 428 may be sent to head-mounted system 406, and head-mounted system 406 may identify selected information 432 from information 428 for display to person 410 based on profile 438 and policy 450.

In this depicted example, only selected information 432 in information 428 is displayed at head-mounted system 406 and number of display devices 408. For example, information 428 may be encrypted to form encrypted information 440. In one example, set of keys 442 is selected for person 410 using profile 438 for person 410. Set of keys 442 is configured to decrypt selected information 432 for person 410 based on profile 438. In other words, a key in set of keys 442 is included for information 428 that person 410 is to view at head-mounted system 406. Information not decrypted in encrypted information 440 is not displayed to person 410 on head-mounted system 406.

In these illustrative examples, set of keys 442 may be an empty or null set without keys, or one or more keys. In other words, in some cases, set of keys 442 may be a null set in which no information should be displayed in encrypted information 440.

In another example, each image in images 422 has first number of portions 444, and information 428 has second number of portions 446. In these illustrative examples, a portion in first number of portions 444 is an area within an image.

This area may be defined in a number of different ways. For example, an area may be defined as the area for a particular component in the image or may be user defined, depending on the particular implementation. For example, the component may be an antenna that is in the image that does not need to be displayed to one or more persons.

A portion of information 428 within second number of portions 446 for information 428 may take a number of different forms. For example, in some cases, the portion may be a schematic or other type of information about a wiring system, the location of a skin panel, a cross section of plies in the orientation of plies in a skin panel, and/or other suitable types of information.

In this depicted example, a set of keys is identified for each person in number of persons 418. The set of keys is configured to decrypt selected information in the encrypted information and a selected number of portions of each image in encrypted information 440. Images 422 also may be encrypted to form encrypted images 448 in encrypted information 440.

As a result, the display of selected information on the selected portions of the number of images on each display device in number of display devices 408 for each person in number of persons 418 is performed using the set of keys that corresponds to that person at the display device. As a result, a portion of any of encrypted information 440 and encrypted images 448 that is unencrypted using the set of keys is not displayed on the display device to the particular person using the display device.

In this manner, information may be identified for each person based on a profile for the person. In this manner, information that each person needs or is able to see is displayed for that particular person at the display device used by the person. As a result, a person may not see information that is not needed and/or that the person is not allowed to see.

Additionally, in these illustrative examples, information module 402 uses filtering process 452 to filter images 422 to form selected portion of images 454. For example, without limitation, filtering process 452 may filter images 422 to identify only the portions of images 422 that are relevant to the number of operations currently being performed on aircraft 414.

As one illustrative example, if person 410 is performing an operation on a skin panel that has an inconsistency, filtering process 452 may filter out the portions of images 422 containing other parts around the skin panel. Selected portion of images 454 are displayed on number of display devices 408 such that only the relevant portion of the skin panel is displayed. For example, an antenna, door, window, or other part of an aircraft may not be displayed on number of display devices 408.

As yet another example, images 422 may include ground equipment, personnel, and/or other objects that are not relevant to the number of operations being performed on aircraft 414 by person 410. Filtering process 452 filters out these objects such that only the portion of aircraft 414 relevant to the number of operations being performed on aircraft 414 is displayed on number of display devices 408 to number of persons 418.

In some illustrative examples, information module 402 may be configured to display graphical indicators on images 422 displayed at head-mounted system 406 or change the manner in which portions of images 422 are displayed based on profile 438 for person 410. As one illustrative example, graphical indicators, such as graphical boxes, may be displayed over the portions of images 422 that person 410 is not authorized to view. As another illustrative example, the portions of images 422 that person 410 is not authorized to view may be shadowed, occluded, darkened, deleted, or changed in some other suitable manner such that person 410 is not able to receive and/or view these portions.

The illustration of augmented reality information system 400 in FIG. 4 is not meant to imply physical or architectural limitations to the manner in which different advantageous embodiments may be implemented. Augmented reality information system 400 is presented as one illustrative implementation.

For example, the object in augmented reality information system 400 is directed towards aircraft 414. In other illustrative examples, augmented reality information system 400 may be used with other types of objects. For example, objects may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, an engine, a wing, and elements and components thereof.

Figure 5:
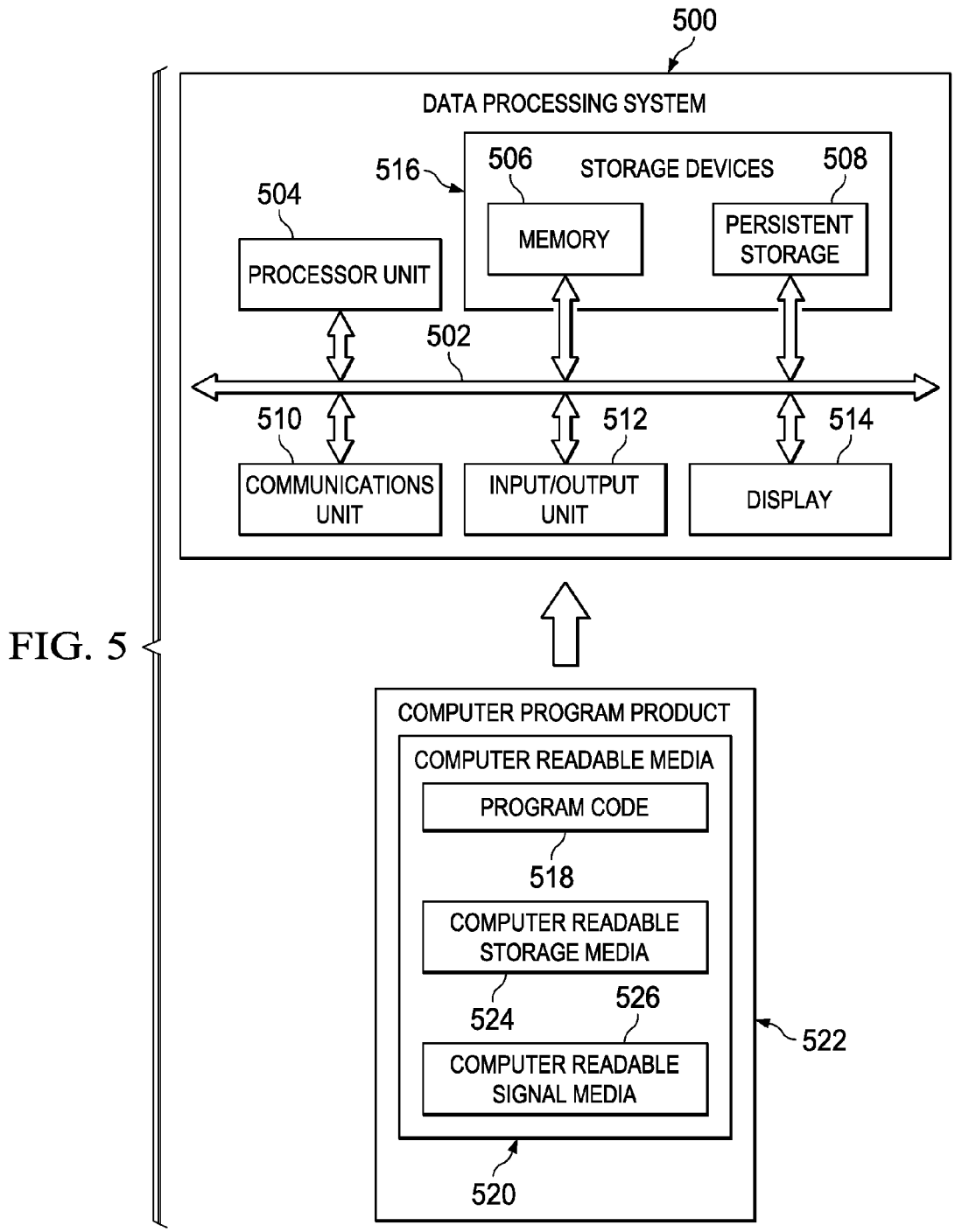
FIG. 5 is an illustration of a data processing system in accordance with an advantageous embodiment.

Turning now to FIG. 5, an illustration of a data processing system is depicted in accordance with an advantageous embodiment. Data processing system 500 in FIG. 5 is an example of a data processing system that may be used to implement different devices in the different advantageous embodiments. For example, data processing system 500 may be used to implement one or more of number of computers 338 in computer system 336 in FIG. 3 and/or computer system 404 in FIG. 4.

In this illustrative example, data processing system 500 includes communications fabric 502, which provides communications between processor unit 504, memory 506, persistent storage 508, communications unit 510, input/output (I/O) unit 512, and display 514. Processor unit 504 processes instructions for software that may be loaded into memory 506. Processor unit 504 may be a number of processors, a multi-processor core, or some other type of processor, depending on the particular implementation. A number, as used herein with reference to an item, means one or more items.

Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information, either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for person input through a keyboard, a mouse, and/or some other suitable input device. Further, input/output unit 512 may send output to a printer. Display 514 provides a mechanism to display information to a person.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500.

In some instances, computer readable storage media 524 may not be removable from data processing system 500. In these examples, computer readable storage media 524 is a physical or tangible storage device used to store program code 518, rather than a medium that propagates or transmits program code 518.

Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to or in place of those illustrated for data processing system 500. Other components shown in FIG. 5 can be varied from the illustrative examples shown.

For example, the different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations.

With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 506 or a cache, such as found in an interface and memory controller hub that may be present in communications fabric 502.

Figure 6:
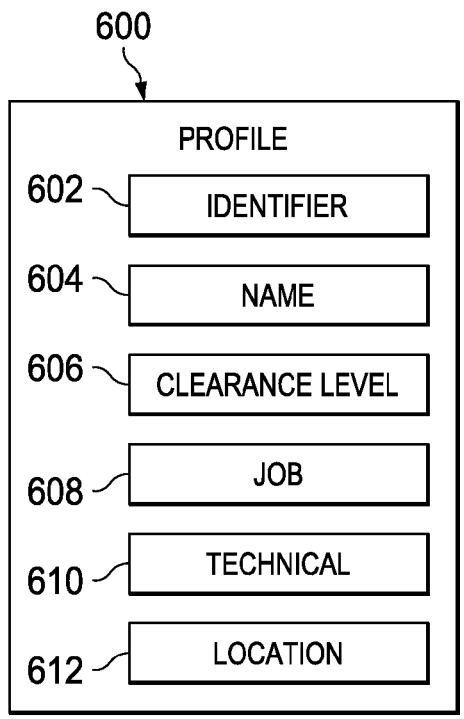
FIG. 6 is an illustration of a profile in accordance with an advantageous embodiment.

With reference now to FIG. 6, an illustration of a profile is depicted in accordance with an advantageous embodiment. In this illustrative example, profile 600 is an example of one implementation for a profile in number of profiles 436 in profile database 434 in FIG. 4. In this illustrative example, profile 600 includes identifier 602, name 604, language level, security level, clearance level 606, job 608, technical 610, location 612, and other suitable information. Identifier 602 may be used to uniquely identify the particular person. Name 604 is the name of the person in these examples.

Clearance level 606 is a security or clearance level for the person. This security or clearance level may be related to security that is internal to an organization and/or through government regulations. For example, a clearance level may be confidential and non-confidential. In other examples, more than two clearance levels may be present and identified by numbers, letters, or some other designation. In other examples, multiple clearance levels may be set for different types of information within a particular organization.

Job 608 identifies the job performed by the person. This job may be used to identify the type of information the person may view. Technical 610 also provides an identification of the technical background of the person and may include the level of expertise of the person.

Location 612 may be used to determine whether export-controlled information can be displayed on the display device at the location for the particular display device. For example, if at least one of the images and information is export controlled, location 612 may be used to determine whether a portion of the image should be filtered out, some of the information should not be transmitted, or other filtering should occur to maintain compliance with export-control laws.

Figure 7:
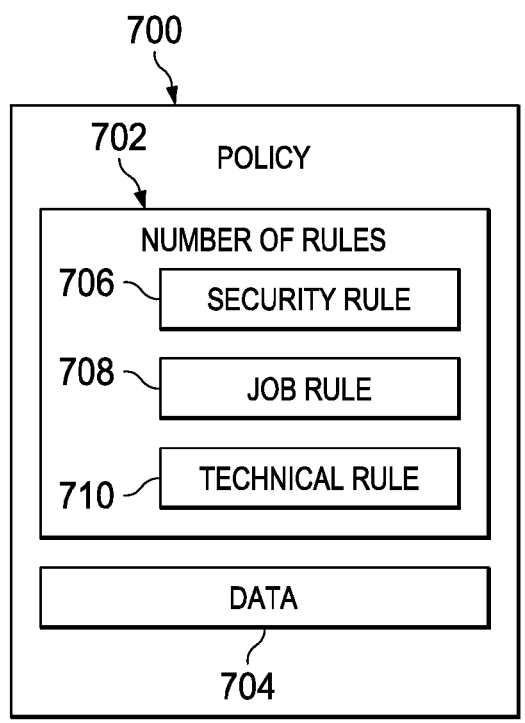
FIG. 7 is an illustration of a policy in accordance with an advantageous embodiment.

With reference now to FIG. 7, an illustration of a policy is depicted in accordance with an advantageous embodiment. In this illustrative example, policy 700 is an example of one implementation of policy 450 in FIG. 4.

In this illustrative example, policy 700 includes number of rules 702 and data 704. Number of rules 702 in policy 700 may be applied to a profile, such as profile 600 in FIG. 6. In this manner, selected information for the particular person associated with the profile may be identified. Data 704 may include values or other information used in applying number of rules 702 to a profile.

As depicted, number of rules 702 may include a number of different types of rules. For example, number of rules 702 may include, without limitation, at least one of language rule, clearance rule, security rule 706, job rule 708, technical rule 710, and/or other suitable types of rules.

Security rule 706 may indicate that a certain clearance or security level is needed to view certain information in the information that may be added to the images. Security rule 706 may indicate that portions of the images may require the security level.

Additionally, security rule 706 also may look to determine whether export-controlled information is present and determine whether particular viewers can view the information at different locations. Further, security rule 706 also may include a rule to determine whether confidential information is present and whether the person at a display device is authorized to view the confidential information.

Job rule 708 may be used to identify information that is relevant for a particular person. For example, if the persons viewing the information include an electrical engineer and a materials expert, the information displayed to these two people may be different. For example, schematics may not be displayed to the materials expert, while information about composite materials in a panel may not be displayed to the electrical engineer. The information may include schematics for electrical systems and information about composite materials in a panel. Technical rule 710 may be used to identify information that is relevant to a particular person based on their expertise, education, and/or other suitable factors.

The illustration of profile 600 in FIG. 6 and policy 700 in FIG. 7 is not meant to imply limitations to the manner in which different profiles and policies may be implemented. In other illustrative examples, a policy may include other information in place of or in addition to the information illustrated in profile 600. Other policies may include other rules other than those described for number of rules 702.

Figure 8:
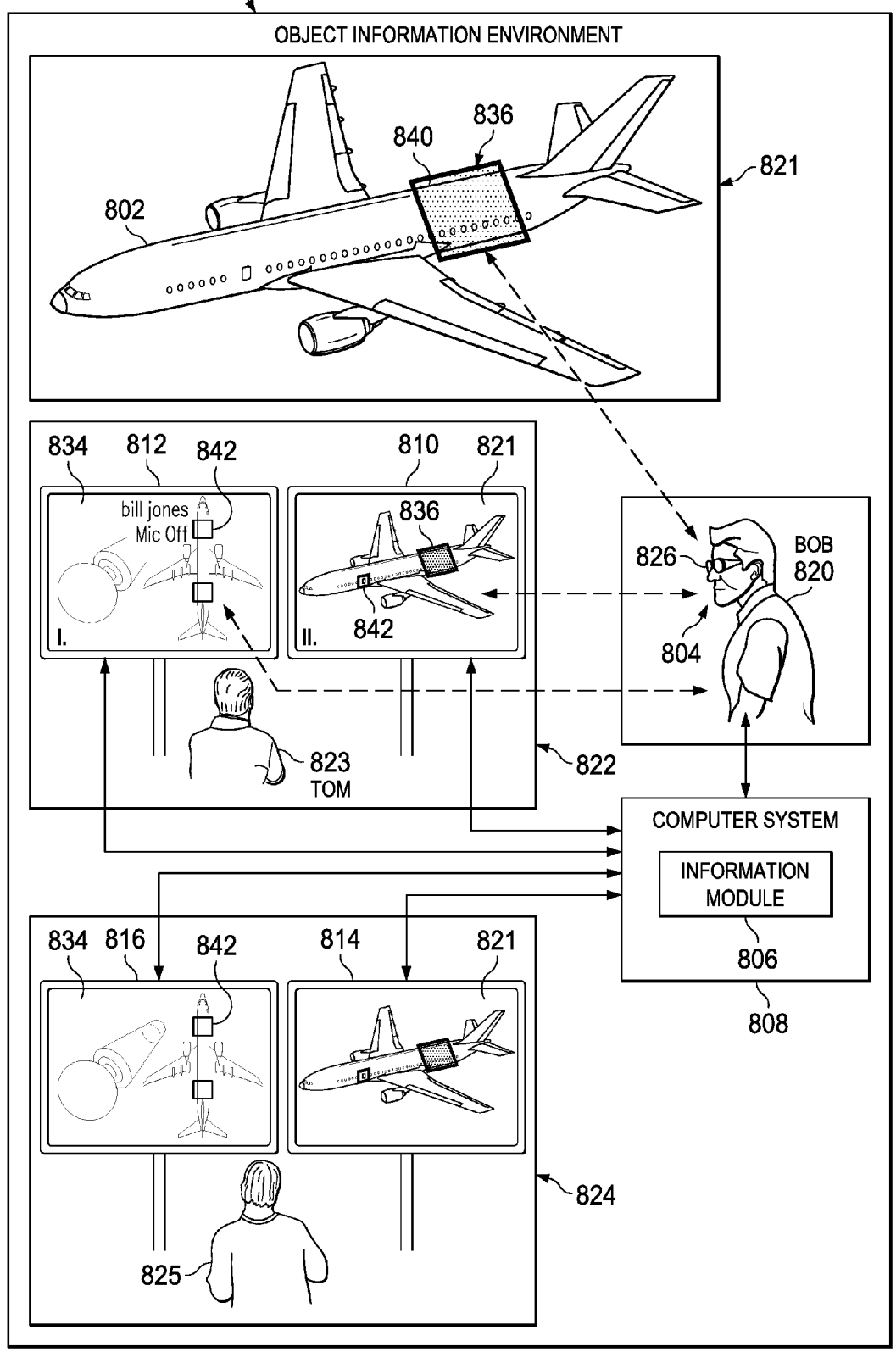
FIG. 8 is an illustration of an object information environment in accordance with an advantageous embodiment.

With reference now to FIG. 8, an illustration of an object information environment is depicted in accordance with an advantageous embodiment. In this illustrative example, object information environment 800 is an example of one implementation for object information environment 300 in FIG. 3.

In this illustrative example, object information environment 800 includes head-mounted system 804, information module 806 in computer system 808, display device 810, display device 812, display device 814, and display device 816. Display device 810 and display device 812 are in location 822, while display device 814 and display device 816 are in location 824. Location 822 and location 824 may be remote to each other and remote to the location of person 820 wearing head-mounted system 804. Person 820 may be at the location of aircraft 802.

Person 823 is viewing display device 810 and display device 812 in location 822. Person 825 is viewing display device 814 and display device 816 in location 824. Person 825 may have a higher security or clearance level than person 823 and person 820. Further, person 825 may have a higher level of technical expertise than person 823 and person 820. Additionally, person 823 may have a higher clearance level and level of technical expertise than person 820. For example, person 820 may be an engineer, person 823 may be a senior engineer, and person 825 may be the boss of person 823 and person 820.

As depicted, head-mounted system 804 takes the form of eyeglasses 826. Eyeglasses 826 include a camera system configured to generate video data for aircraft 802 from the viewpoint of person 820. Further, eyeglasses 826 include a display device through which person 820 may view augmented information about aircraft 802 in addition to the live physical view of aircraft 802 through eyeglasses 826. As depicted, images 821 of aircraft 802 from the viewpoint of person 820 are displayed to person 823 through eyeglasses 826.

The video data generated by eyeglasses 826 is sent to information module 806 using a wireless communications link. Information module 806 is also configured to communicate wirelessly with display device 810, display device 812, display device 814, and display device 816. In this manner, communications between eyeglasses 826, display device 810, display device 812, display device 814, and display device 816 may be performed through information module 806.

Information module 806 may receive the video data from eyeglasses 826 as a continuous video stream or periodically. In this illustrative example, information module 806 processes the video data. For example, information module 806 identifies the type and/or model of aircraft 802. Information module 806 also identifies a profile for person 820. Further, information module 806 identifies a profile for person 823 in location 822 and person 825 in location 824.

Information module 806 displays images 821 of aircraft 802 from the viewpoint of person 820 on display device 810. In this manner, person 823 can see what person 820 sees. Further, based on the profile for person 823 and the type and/or model of aircraft 802, information module 806 displays schematic 834 for aircraft 802 on display device 812. Person 823 uses images 821 displayed on display device 810 and schematic 834 displayed on display device 812 to identify area 836 for aircraft 802. Area 836 may be an area in which an inconsistency has been identified.

In this illustrative example, person 823 enters user input that selects area 836 on schematic 834 and images 821. Information module 806 receives this user input and displays graphical indicator 840 on images 821 viewed by person 820. Further, person 823 may also enter user input in the form of voice instructions. For example, person 823 may instruct person 820 what to look for in area 836 and/or how to perform a number of operations for area 836.

In some cases, person 820 may switch views through eyeglasses 826 from images 821 to schematic 834. Further, person 820 may use eyeglasses to view both schematic 834 and images 821 at the same time.

In this illustrative example, person 823 has a higher clearance level than person 820. Person 823 has the clearance to view area 842 for aircraft 802, while person 820 does not have the clearance to view area 842. When schematic 834 is displayed to person 820 through eyeglasses 826, area 842 and/or information about area 842 is not displayed to person 820.

Additionally, information module 806 may also display images 821 on display device 814 and schematic 834 on display device 816 for person 825 to view. Person 825 has a higher clearance level than person 823 in the depicted example. Based on the level of clearance for person 825, information module 806 displays more information about area 842 on schematic 834 on display device 816 for person 825 than on schematic 834 on display device 812 for person 823. In this manner, information module 806 only displays the information for which a person has clearance on the display devices being viewed by the person.

In this illustrative example, person 825 may monitor the progress of the number of operations being performed on area 836 by person 820 in real time and the instructions being provided by person 823. Further, person 825 may provide further instructions and/or information to person 823 and/or person 820 based on images 821 on display device 814 and schematic 834 on display device 816.

The illustration of object information environment 800 in FIG. 8 is not meant to imply physical or architectural limitations to the manner in which different advantageous embodiments may be implemented. For example, in some cases, the display devices viewed by person 823 and/or person 825 may be part of head-mounted systems, similar to head-mounted system 804.

Figure 9:
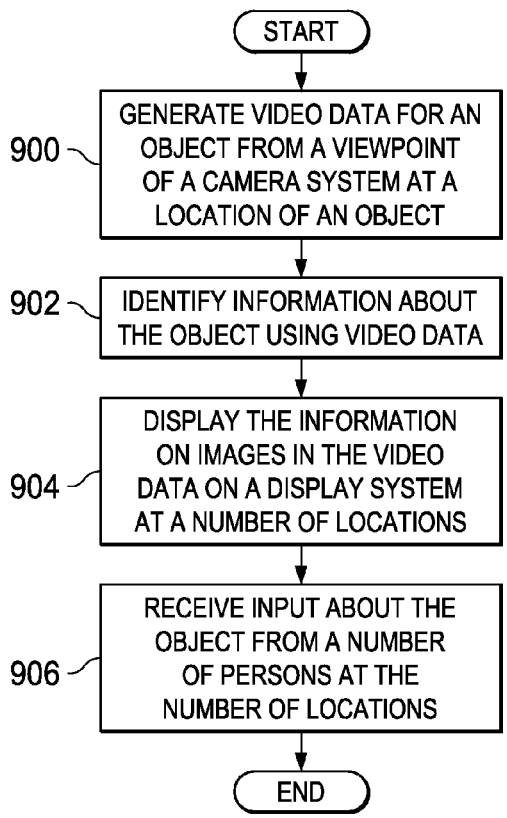
FIG. 9 is a flowchart of a process for displaying information in accordance with an advantageous embodiment.

With reference now to FIG. 9, a flowchart of a process for displaying information is depicted in accordance with an advantageous embodiment. The process illustrated in FIG. 9 may be implemented in an object information environment, such as object information environment 300 in FIG. 3.

The process begins by generating video data for an object from a viewpoint of a camera system at a location of an object (operation 900).

Information about the object is identified using the video data (operation 902). The process then displays the information on images in the video data on a display system at a number of locations (operation 904). The display of the image with the information on the images at the number of locations is from a viewpoint of the camera in these examples. The process then receives input about the object from a number of persons at the number of locations (operation 906), with the process terminating thereafter.

Figure 10:
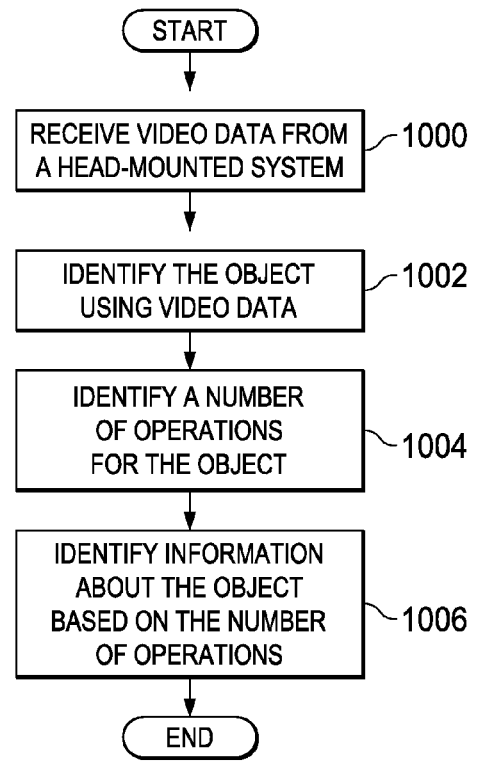
FIG. 10 is a flowchart of a process for identifying information about an object in accordance with an advantageous embodiment.

With reference now to FIG. 10, a flowchart of a process for identifying information about an object is depicted in accordance with an advantageous embodiment. The process illustrated in FIG. 10 may be implemented in a component, such as information module 326 in FIG. 3. This process may be implemented in hardware, software, or a combination of the two.

The process begins by receiving video data from a head-mounted system (operation 1000). The video data is a video stream of images for an object, such as an aircraft. The process then identifies the object using the video data (operation 1002). For example, in operation 1002, the process may use pattern recognition software to identify the object. In some cases, the process may use user input to identify the object.

Next, the process identifies a number of operations for the object (operation 1004). In operation 1004, the number of operations may include operations that are being performed on the object and/or operations that are to be performed. These operations may include, for example, without limitation, maintenance, inspection, rework, inventory, and/or other suitable types of operations.

The process then identifies information about the object based on the number of operations (operation 1006), with the process terminating thereafter. The information may include, for example, schematics of the object, a list of materials used in the object, the dimensions for the object, contact numbers for parts in the object, and/or other suitable types of information. Operation 1006 may be performed using a database containing information about the object and/or other objects.

Figure 11:
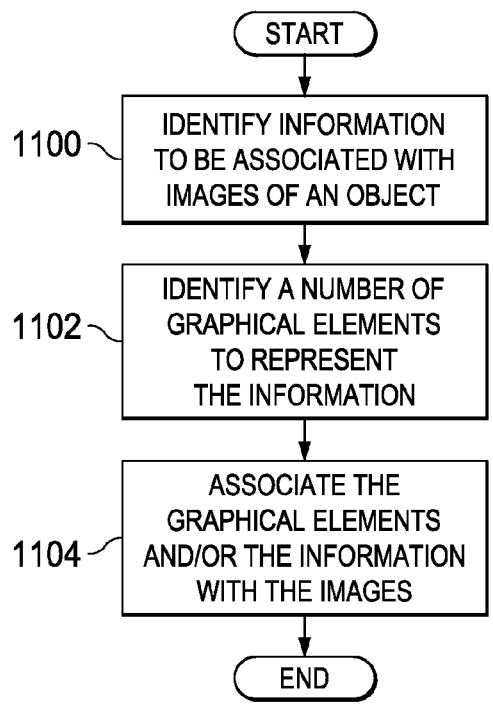
FIG. 11 is a flowchart of a process for associating information with images in video data in accordance with an advantageous embodiment.

With reference now to FIG. 11, a flowchart of a process for associating information with images in video data is depicted in accordance with an advantageous embodiment. The process illustrated in FIG. 11 may be implemented in information module 326 in FIG. 3. This process may be implemented in hardware, software, or a combination of the two.

The process begins by identifying information to be associated with images of an object (operation 1100). The information may be, for example, the information identified in operation 1006 in FIG. 10 or some portion of the information identified in operation 1006. As one illustrative example, when the object is a skin panel for an aircraft, the information for the skin panel may include a schematic for a wiring system located behind the skin panel.

The process then identifies a number of graphical elements to represent the information (operation 1102). For example, the graphical elements may be text, graphical indicators, pictures, buttons, and/or other types of graphical elements that may be displayed on a display device. As one illustrative example, a graphical element for the wiring system may be a picture of the schematic for the wiring system located behind the skin panel.

In other examples, the graphical element may be a graphical button that opens a window displaying the schematic when selected. In still other examples, the number of graphical elements may include a graphical indicator for outlining the area on the skin panel behind which the wiring system is located and a textual description of the wiring system.

Thereafter, the process associates the graphical elements and/or the information with the images (operation 1104), with the process terminating thereafter. Operation 1104 may be performed by, for example, displaying the graphical elements on the images on the display device.

For example, the picture of the schematic for the wiring system or the graphical button may be displayed over the images for the skin panel. In some cases, operation 1104 may be performed by generating instructions for displaying the information and/or graphical elements on the images.

In this illustrative example, operation 1104 may be performed prior to the images being sent to a display device for display. In this manner, the images, along with the graphical elements associated with the images, may be sent to the display device for viewing by a person. In other illustrative examples, operation 1104 may be performed by the display device on which the images are displayed.

For example, the display device may have a graphics adapter configured to receive the information and/or graphical elements from the information module. The graphics adapter may be configured to display the information and/or graphical elements over the images displayed on the display device based on instructions associating the information and/or graphical elements with the images.

Figure 12:
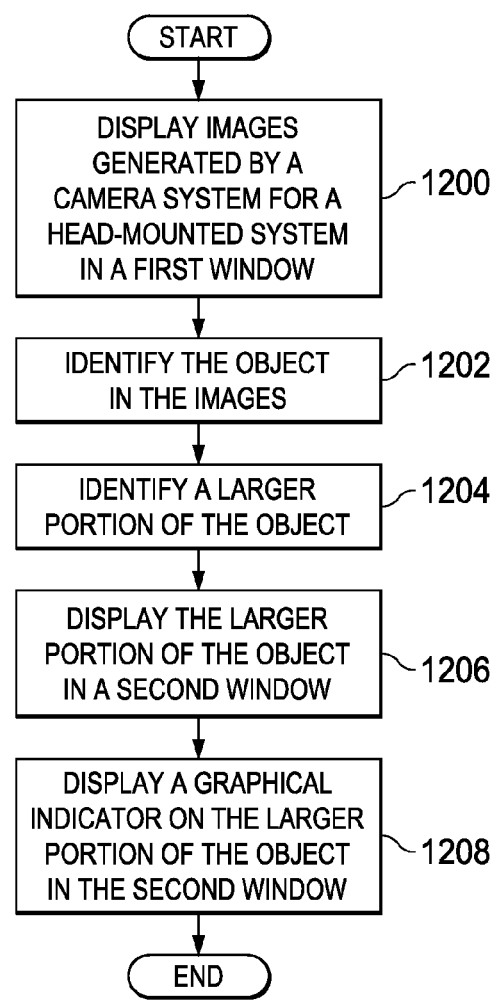
FIG. 12 is a flowchart of a process for displaying information in accordance with an advantageous embodiment.

With reference now to FIG. 12, a flowchart of a process for displaying information is depicted in accordance with an advantageous embodiment. The process illustrated in FIG. 12 may be implemented in information module 326 in FIG. 3. This process may be implemented in hardware, software, or a combination of the two.

The process begins by displaying images generated by a camera system for a head-mounted system in a first window (operation 1200). The first window is a window displayed on a display device. The images may be for a small portion of an object. For example, the images may be images of a door of an aircraft from the viewpoint of the person wearing the head-mounted system.

The process then identifies the object in the images (operation 1202). Thereafter, the process identifies a larger portion of the object (operation 1204). The larger portion of the object may include the entire object or some portion of the object that includes the small portion of the object that is in the images.

Thereafter, the process displays the larger portion of the object in a second window (operation 1206). The second window may be displayed on the same display device as the first window or on a different display device.

Next, the process displays a graphical indicator on the larger portion of the object in the second window (operation 1208), with the process terminating thereafter. The graphical indicator indicates the location of the small portion of the object within the larger portion of the object displayed. The graphical indicator may be, for example, an outline of the small portion within the larger portion of the object displayed in the second window.

Figure 13:
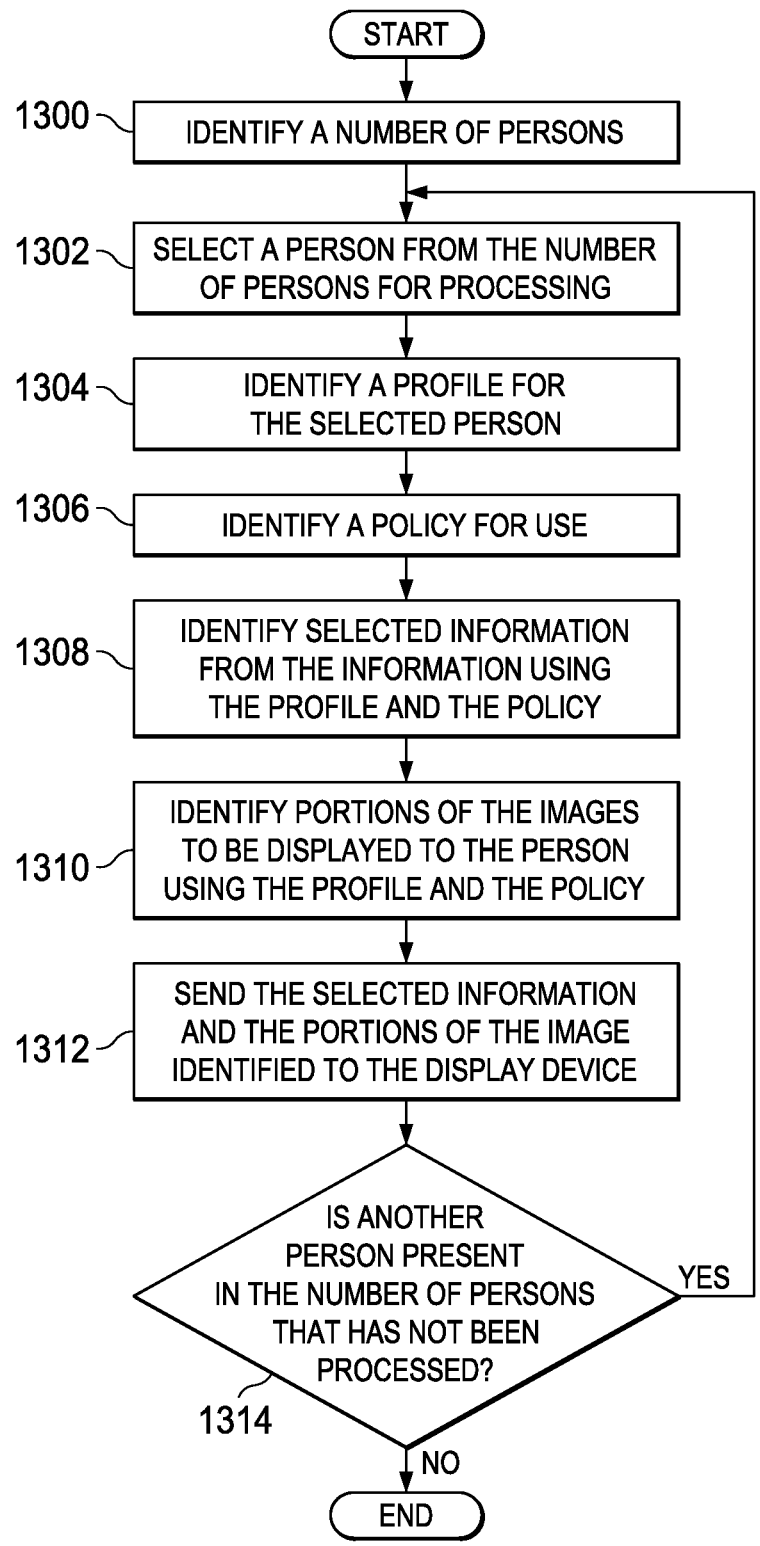
FIG. 13 is a flowchart of a process for displaying information on images in accordance with an advantageous embodiment.

With reference now to FIG. 13, a flowchart of a process for displaying information on images is depicted in accordance with an advantageous embodiment. This process includes identifying information to be displayed to each person. The information selected for each person may be identified based on the profile for the person and a policy. This process also may be implemented in information module 326 in FIG. 3. This process may be implemented in hardware, software, or a combination of the two.

The process begins by identifying a number of persons (operation 1300). Thereafter, the process selects a person from the number of persons for processing (operation 1302). A profile is identified for the selected person (operation 1304). The process then identifies a policy for use (operation 1306).

The process then identifies selected information from the information using the profile and the policy (operation 1308). For example, the policy may be applied to the profile to form a filter for identifying the selected information. The information in operation 1308 may be, for example, the information identified in operation 1006 in FIG. 10. In some cases, the policy may indicate that the selected information identified is to be encrypted. In this manner, operation 1308 may include encrypting the selected information to form encrypted information.

The process then identifies portions of the images to be displayed to the person using the profile and the policy (operation 1310). In some cases, the policy may indicate that the portions of the images identified are to be encrypted. In this manner, operation 1310 may include encrypting the portions of the images to be displayed to form encrypted images.

The process then sends the selected information and the portions of the image identified to the display device (operation 1312). Thereafter, a determination is made as to whether another person is present in the number of persons that has not been processed (operation 1314). If another person is present, the process returns to operation 1302. Otherwise, the process terminates.

Figure 14:
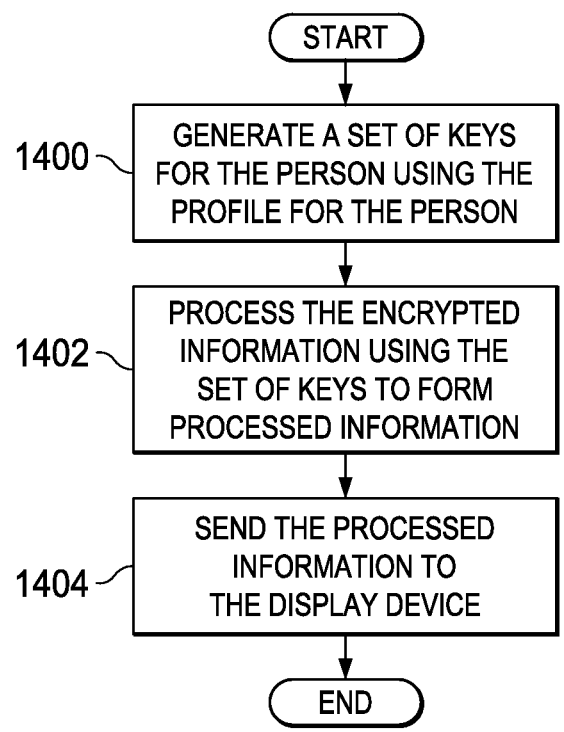
FIG. 14 is a flowchart of a process for sending information to a display device in accordance with an advantageous embodiment.

With reference now to FIG. 14, a flowchart of a process for sending information to a display device is depicted in accordance with an advantageous embodiment. The process illustrated in this figure may be implemented in information module 326 in FIG. 3. This process may be implemented in hardware, software, or a combination of the two. Further, this process is an example of one implementation of operation 1312 in FIG. 13. In particular, this process may be performed when the selected information is encrypted to form encrypted information and when the portions of the images are encrypted to form encrypted images.

The process begins by generating a set of keys for the person using the profile for the person (operation 1400). The process then processes the encrypted information using the set of keys to form processed information (operation 1402). This processing may include decrypting any information that can be decrypted using the set of keys and leaving any information that cannot be decrypted with the set of keys encrypted. In some illustrative examples, the set of keys may be a null set of keys, and no information is decrypted.

Thereafter, the process sends the processed information to the display device (operation 1404), with the process terminating thereafter. In operation 1404, only the information that is decrypted is displayed on the display device.

Figure 15:
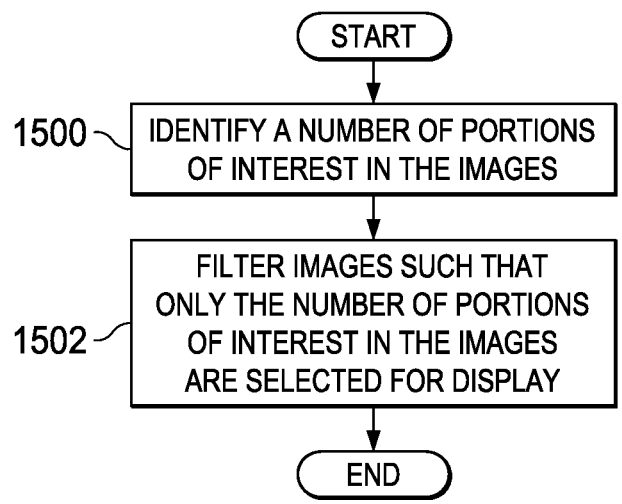
FIG. 15 is an illustration of a flowchart of a process for filtering images for display on a display in accordance with an advantageous embodiment.

With reference now to FIG. 15, an illustration of a flowchart of a process for filtering images for display on a display device is depicted in accordance with an advantageous embodiment. The process illustrated in this figure may be implemented in information module 326 in FIG. 3. More specifically, this process may be implemented using filtering process 452 in information module 402 in FIG. 4. This process may be implemented in hardware, software, or a combination of the two. Further, this process is an example of one implementation of operation 1310 in FIG. 13.

The process begins by identifying a number of portions of interest in the images (operation 1500). For example, the number of portions of interest may include only the portions of the images that are of the object or the portion of the object for which a number of operations are being performed.

For example, maintenance operations may be performed on a wing of an aircraft. The images of the wing may include ground equipment, portions of the fuselage of the aircraft, personnel, and/or other objects that are not relevant to performing maintenance on the wing. The process identifies the number of portions of interest in the images based on the portions of the image that are relevant to the maintenance operations.

The process then filters images such that only the number of portions of interest in the images are selected for display (operation 1502), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for obtaining information about objects. In these illustrative examples, the different advantageous embodiments may be particularly useful to obtaining information about aircraft and, more specifically, to obtaining information to perform maintenance operations on aircraft.

In one advantageous embodiment, a camera system generates video data for an object from a viewpoint of the camera system at a location of the object. Information about the objects is identified. This information is displayed on the images in the video data on a display system at a number of locations. The display of the images with the information on the images at the number of locations is from the viewpoint of the camera system.

With one or more of the different advantageous embodiments, an adjustably augmented and/or immersive capability may be provided. In other words, an apparatus, such as augmented reality information system 316 in FIG. 3, can adaptably adjust the displayed imagery to use different levels of augmentation. For example, the display may be varied or adjusted from a direct, unaugmented, exclusively real-world view of the object to a partially immersive and partially augmented display and to a fully immersive and fully augmented virtual reality display. The fully immersive and fully augmented virtual reality display is one in which the viewed object is seen exclusively in a fully virtual reality mode of operation without real world video imagery. The information overlays all of the image, or the image is no longer used. Of course, the adaptation may move through any level of augmentation of the images of the object, depending on the need or situation.

This adaptive adjustment may be performed in a number of different ways. For example, the adjustment may be performed at the direction of at least one of a person, a computer system, an information module, and other suitable components.

In this manner, for example the object can be viewed as seen in the real world so an issue can be discussed in the of the real-world visual representation of the object. As more information on the viewed object is needed, augmented reality information system 316 can progressively add more detail. This detail may be in the form of augmented detail in the information displayed on the images. In doing so, as a further example, layers of the object may be virtually removed to reveal sub-components and/or structures.

Further, the real-world image can be partially and/or entirely replaced with positionally in-context, detailed, but entirely virtual augmented data. This data may include, for example, at least one of wiring schematics, static and dynamic stress/strain data, plumbing schematics, quality assurance and inspection information, production and assembly procedures, maintenance and repair parts data, checklists and procedures, and other suitable data.

Thus, the different advantageous embodiments enable collaboration between people to view all or a portion of the object and comprehend many various interdisciplinary engineering aspects of the object. As a result, the different advantageous embodiments may reduce the time and effort needed to perform operations, such as, for example, without limitation, maintenance, testing, or design of an object.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages, as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a computer system configured to receive video data comprising images of an object from a camera system at a location of the object; identify the object using the video data and an object recognition process; identify information about the object using a database of objects including the object, wherein identification of the information is made by the object recognition process, wherein the information comprises first information and second information different from the first information; add the information to the video data; identify a first portion of the images for a first user and a second portion of the images for a second user, the first portion of the images different from the second portion of the images; and
    concurrently display the first portion of the images and the first information to the first user on a first display system at a first location and the second portion of the images and the second information to the second user on a second display system at a second location, wherein the first location is different from the location of the object and the second location is different from the first location and the location of the object;
    wherein the first user has a first security clearance and the second user has a second security clearance higher than the first security clearance; and
    the computer system is configured to identify the first information and the first portion of the images for the first user based on the first security clearance and identify the second information and the second portion of the images for the second user based on the second security clearance.

2. The apparatus of claim 1,
    wherein the camera system is worn by a third user at the location of the object and comprises:
    a display device configured to be worn by the third user at the location of the object and display the information on the images in the video data on the display device worn by the third user at the location of the object.

3. The apparatus of claim 1, wherein the computer system is configured to decrypt the information about the object using a set of keys, wherein the set includes a first key for the first security clearance and a second key for the second security clearance.

4. The apparatus of claim 1, wherein the images in the video data are for a portion of the object and wherein at least one of the first display system and the second display system is configured to display a larger portion of the object including the portion and display a graphical indicator on the larger portion in addition to being configured to display the information on the images in the video data of the portion of the object, wherein the graphical indicator identifies the portion within the larger portion.

5. The apparatus of claim 1, wherein the information presented to the first user is based on a profile for the first user and the information presented to the second user is based on a profile for the second user.

6. A method for displaying information, the method comprising:
    generating, by a camera system, video data comprising images of an object from a viewpoint of the camera system at a location of the object;
    identifying the object using the video data and an object recognition process executed by a computer system;
    identifying the information about the object using a database of objects including the object, wherein identification of the information is made by the object recognition process wherein the information comprises first information and second information different from the first information;
    adding the information to the video data;
    identifying a first portion of the images for a first user and a second portion of the images for a second user, the first portion being different from the second portion; and
    concurrently displaying the first portion of the images and the first information to the first user on a first display system at a first location and the second portion of the images and the second information to the second user on a second display system at a second location, wherein the first location is different from the location of the object and the second location is different from the first location and the location of the object;
    wherein the first user has a first security clearance and the second user has a second security clearance higher than the first security clearance;
    and
    identifying the first information and the first portion of the images for the first user based on the first security clearance and identifying the second information and the second portion of the images for the second user based on the second security clearance.

7. The method of claim 6,
    wherein the camera system is worn by a third user at the location of the object and further comprising:
    displaying the information on the images in the video data on a display device worn by the third user.

8. The method of claim 6 further comprising, decrypting the information about the object using a set of keys, wherein the set includes a first key for the first security clearance and a second key for the second security clearance.

9. The method of claim 6, wherein the images in the video data are for a portion of the object and further comprising:
    displaying a larger portion of the object including the portion in addition to displaying the information on the images of the portion of the object; and
    displaying a graphical indicator on the larger portion, wherein the graphical indicator identifies the portion within the larger portion.

* * * * *